UNITED STATES PATENT OFFICE.

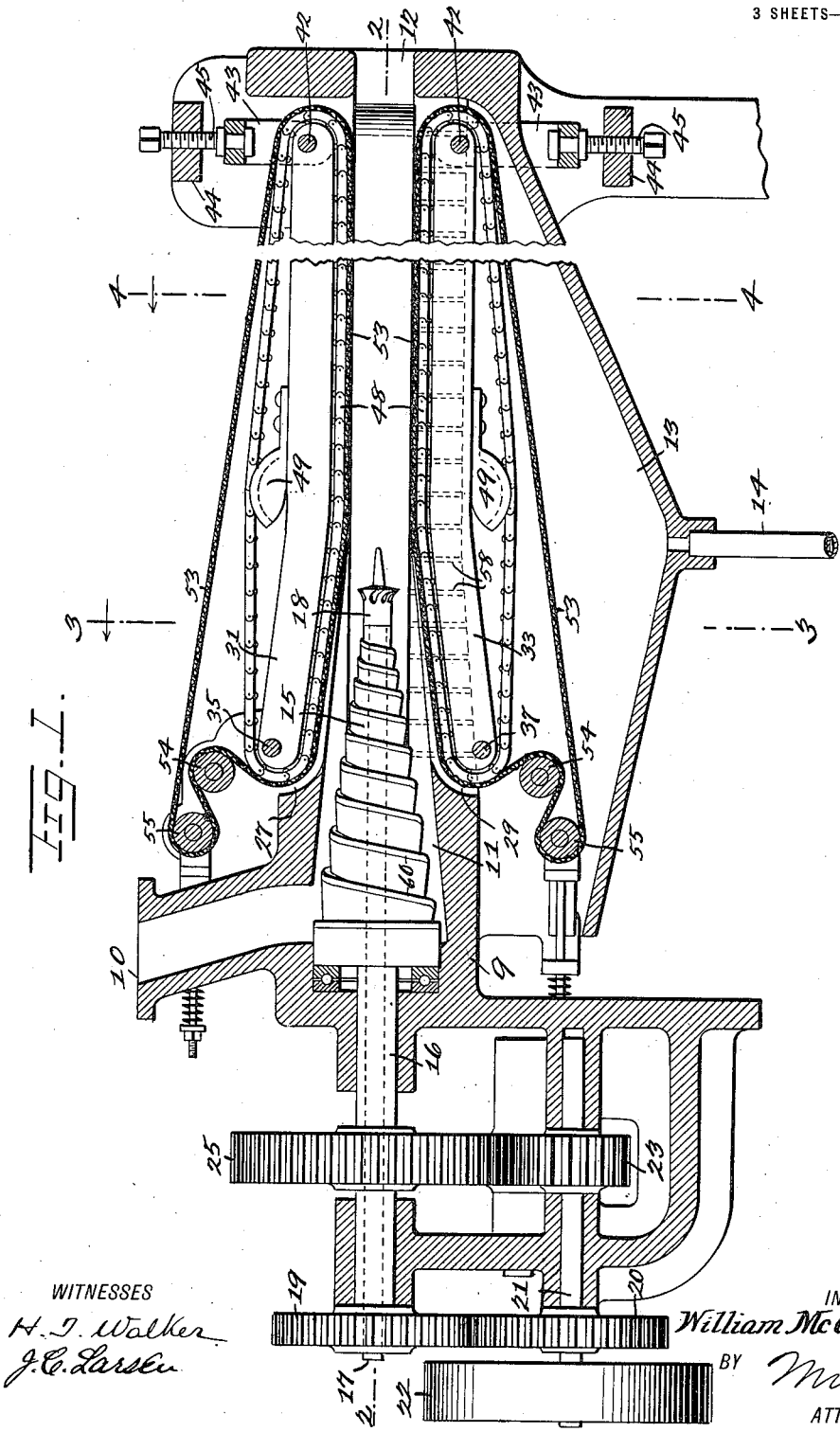

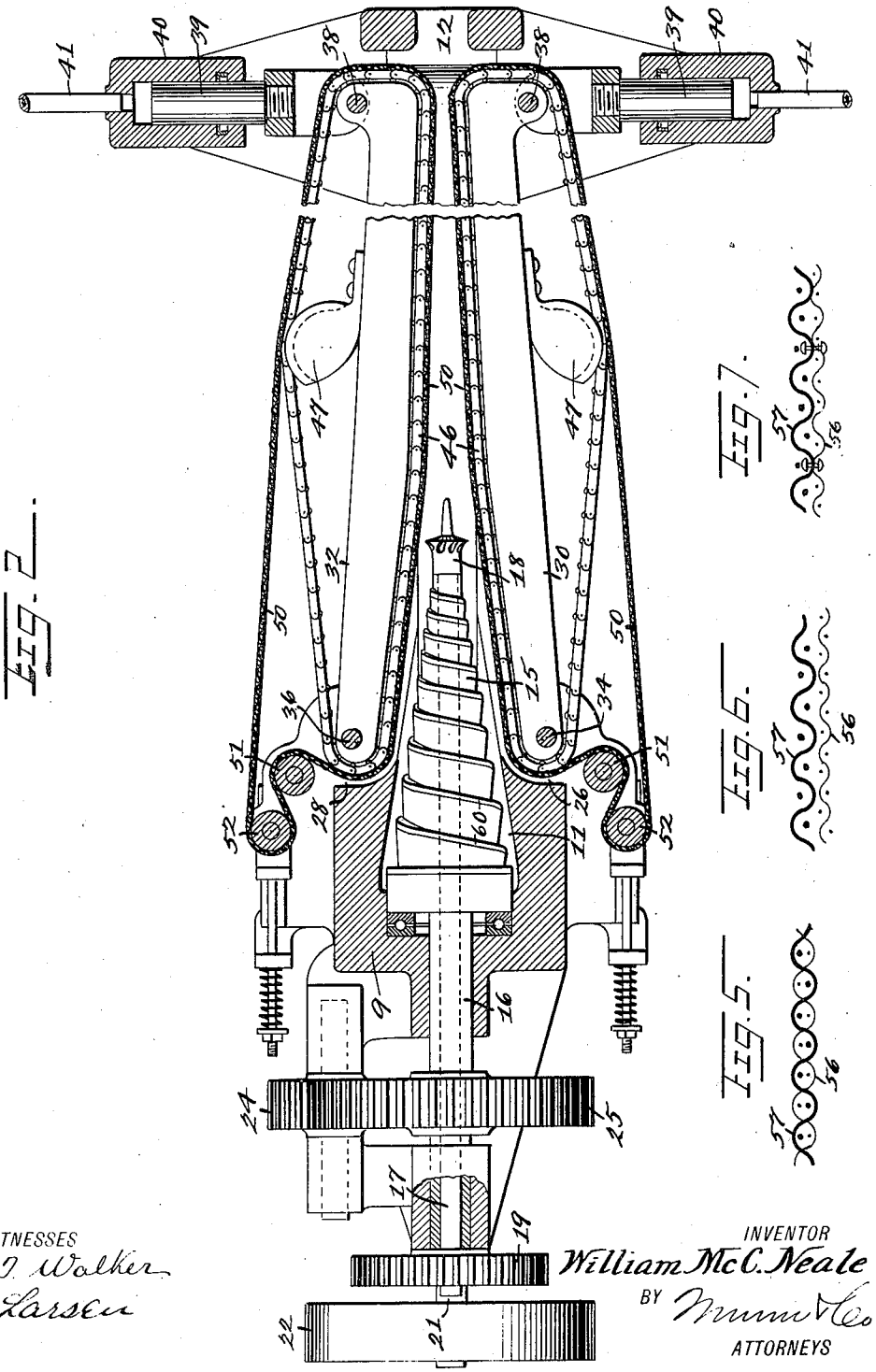

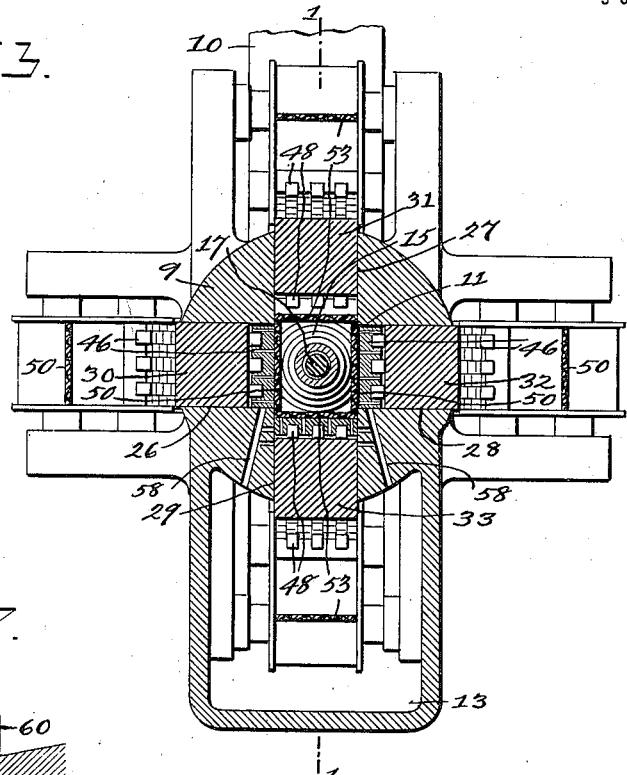
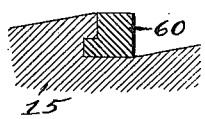
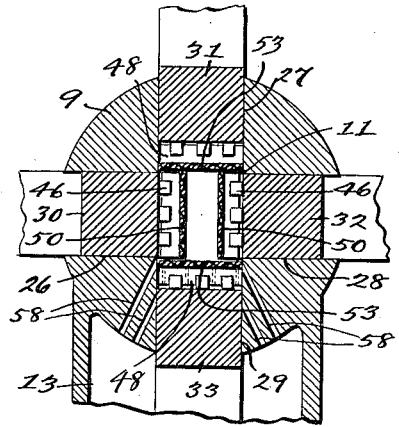

WILLIAM McCORMICK NEALE, OF GREENVILLE, SOUTH CAROLINA.

COTTON-SEED PRESS.

1,153,103.

Specification of Letters Patent.

Patented Sept. 7, 1915.

Application filed September 3, 1914. Serial No. 859,990.

*To all whom it may concern:*

Be it known that I, WILLIAM McC. NEALE, a citizen of the United States, and a resident of Greenville, in the county of Greenville and State of South Carolina, have invented certain new and useful Improvements in Cotton-Seed Presses, of which the following is a specification.

My invention relates to the extraction of oil from seeds, such as cotton seeds, and one of the main objects thereof is to move said seeds through a gradually constricted passage continuously by the movement of the walls of said passage.

A further object is to provide means for adjusting said walls to any desired degree of angularity, to correspondingly effect the degree of inclination of the walls with respect to each other and to the passage formed thereby.

A further object is to provide walls for said passage which permit of thorough drainage of the oil pressed from the seeds.

A further object is to provide said walls of such material as not to glaze the seed kernels as is the case when said heated and crushed kernels come in contact with heated metals, such as steel, and which glaze almost entirely prevents the flow of oil through it; and further objects are to provide such machines which are continuous in operation, simple in construction, composed of few parts not likely to get out of order to require repair, very powerful, well adapted to the purpose for which it is intended, and comparatively inexpensive.

My invention is fully described in the following specification, of which the accompanying drawings form a part, in which the separate parts are designated by the same reference characters in each of the views, and in which:—

Figure 1 is a central, vertical, longitudinal, section taken through a press constructed in accordance with my present invention; Fig. 2 is a section taken on the line 2—2 of Fig. 1; Fig. 3 is a section taken on the line 3—3 of Fig. 1; Fig. 4 is a section taken on the line 4—4 of Fig. 1; Figs. 5, 6 and 7 are fragmentary views of different forms of press cloths which I may employ; and Fig. 8 is a fragmentary section, enlarged, of the helical worm which I employ.

In the drawings forming part of this application I have shown a casing or barrel 9 having a hopper or inlet 10 at its upper side communicating with a hollow interior 11, and the walls of which taper forwardly and inwardly toward the outlet end 12, and I provide an oil receptacle 13 beneath the said barrel having a drain pipe 14 by means of which oil may be led to any desired or convenient point for storage.

Arranged centrally of the chamber 11 is a helical worm 15 caried by a hollow shaft 16 within which is a shaft 17 having a fluted head 18 on its inner end and a gear 19 on its outer end enmeshed with a gear 20 carried by a power shaft 21 having a pulley 22 thereon, whereby it may be rotated, said power shaft 21 also carrying a gear 23 enmeshed with an idle gear 24 in turn enmeshed with a gear 25 on the hollow shaft 16 and, because of the idle gear 24, said worm 15 and fluted head 18 are reversely revolved.

The barrel 9 is provided with four longitudinally arranged slots 26, 27, 28 and 29, at quadrant points, to receive blocks 30, 31, 32, and 33, respectively, pivoted at 34, 35, 36 and 37, respectively, at their inner ends, the outer ends of the blocks 30 and 32 being pivoted, at 38, to oppositely arranged pistons 39 movable in cylinders 40 by hydraulic means, a pipe 41 being provided for each cylinder, and it will be seen that the blocks 30 and 32, as shown in Fig. 2, may be moved inwardly or outwardly at will, the hydraulic operating means not being shown as they may be of any desired form; the outer ends of the blocks 31 and 33, as shown in Fig. 1, are each pivoted, at 42, to oppositely directed plates 43 adjustable in supports 44 by means of screws 45, and it will be seen that the blocks 31 and 33 may also be adjusted on their pivots at will, inwardly or outwardly of the median line of the barrel.

Arranged around each of the blocks 30 and 32 is an endless chain 46, preferably on rollers not shown, and said chains are led over suitable tautening means 47; similarly arranged around each of the blocks 31 and 33 is an endless chain 48 led over tautening means 49, all of said chains being entirely independent of each other, and of any driving means.

Arranged around each of the blocks 30 and 32 is a press cloth belt 50 guided around a fixed pulley 51 and an adjustable pulley 52 which serves to take up any slack in the belts, and similarly arranged around the blocks 31 and 33 are press cloth belts 53 guided over corresponding fixed pulleys 54 and adjustable pulleys 55, and it will be seen that these press cloth belts constitute the walls of the passage for the "meats," as the cooked seeds are called, from the fluted head 18 to the discharge end 12, and move with the "meats" as they are forced through the press by means of the helical worm 15, and I may form the said belts of wire reinforced cloth as shown in Fig. 5, of separate belts of wire and fabric as shown in Fig. 6, of separate belts of wire and fabric riveted together as shown in Fig. 7, or in any other desired manner, but the wire, shown at 56 in said figures, is always on the inner side of the fabric, shown at 57, and in direct contact with the "meats" passed through the press.

As clearly shown at 58, Figs. 1 and 3, I provide a plurality of drain holes in the lower portion of the barrel 9 to permit the escape of the extracted oils, said drains leading to the receptacle 13, and I may also, if desired, drill the links of the side and bottom chains to assist this result, or other means may be provided for leading off said oils from the belts 50 and 53.

Properly cooked seeds, with or without a substance for increasing internal friction in the meats, such as cracked corn, wheat, or oats, are fed steadily into the hopper 10 to the helical worm 15 which, because of its relatively short pitch of thread, forces the meats forwardly through the barrel under constantly increasing pressure, due to the inclination of the blocks 30 and 32, to the fluted head 18 which is revolving in a direction opposite to that of the worm 15 and either faster or slower according to the consistency of the meats, and which head forces the meats toward the discharge end 12.

As the friction between the meats and the press cloth belts and chains is greater than the rolling friction between said chains and corresponding blocks, in view of the rollers shown on each of the chain pintles, said belts and chains will move with the meats and thus form the meats into a more and more solid wedge on their way to the discharge end 12, and against the lateral, hydraulic, pressure caused by the pistons 39 and cylinders 40. In this movement of the meats the oil therein is squeezed out of the same and through the press cloth belts, passing then to the receptacle 13 and drain pipe 14, and this resilient resistance of the pistons 39 and cylinders 40 constitutes a factor of safety to the machine in the event of the admission of hard, foreign matter thereto, and I may, although not shown, provide means for automatically regulating the pressure of the hydraulic means according to the consistency of the meats, although this is true in a degree without the use of any other apparatus.

The mechanical principle of the wedge is well known, and it will therefore be seen that the pressure exerted by the worm and fluted head will not need to be anything near that necessary to completely extract the oil as is the case in machines of this class now known to me; hence the internal friction of the mass of meats need not be as great as in the other machines referred to; neither need the meats be over-cooked or mixed with a substance to increase the internal friction.

In order to secure the best results the heat in the meats must be conserved, and my worm and fluted head serve to raise the temperature of the meats if they had partially cooled in passing from the cooker to the press, and it will be seen that I secure continuous operation, not interrupted for the removal of pressed seed cakes and substitution of unpressed, as in other machines, and the degree of pressure to which said meats are subjected is entirely under the control of the operator, with a consequent result in oil yield; it will also be seen that, in view of the fact that the walls of the passage are fabric, and travel with the meats, the formation of the glaze hereinbefore referred to is impossible, and the percentage of oil yield is very high.

In Fig. 8 I have shown a fragmentary section of the worm 15, to illustrate a wearing bead which I may employ, in order to avoid replacing the worm, the bead 60 being removable when worn for substitution of a new bead.

It will thus be seen that I secure a continuous extraction of oil, between sliding walls which assist in wedging the meats into a more and more compact mass, and through which the oils are free to pass for drainage to a suitable receptacle; it will also be seen that the meats are pressed forwardly into the gradually restricted passage by means of a worm rotating in one direction, and broken up as well as fed forward by a fluted head rotating in the opposite direction, preferably at a speed different from that of the worm; it will also be seen that I may vary the tension of the chains, or of the press cloths at will; it will also be seen that I may vary the diameter of the passage, and the inclination of the walls thereof, at will, and under hydraulic power.

While I have described the machine as particularly applicable to cotton seeds, it will be obvious that it may be used for other purposes where pressure is desired, and I may vary the details to accommodate the press to different uses, within the scope of the following claims, without departing from the spirit of my invention, or sacrificing its advantages.

Having fully described my invention, what I claim as new, and desire to secure by Letters Patent, is:—

1. A press, comprising a barrel, a radially adjustable wall on each side of the interior thereof, a worm therein, a fluted head therein, and means for actuating said worm and head.

2. A press, comprising a barrel, a radially adjustable wall on each side of the interior thereof, a worm therein, a fluted head therein, and means for actuating said worm and head in reverse directions.

3. A press, comprising a barrel, a radially adjustable wall on opposite sides of the interior thereof, and a porous covering for each of said walls and movable with the material being pressed.

4. A press, comprising a barrel, a radially adjustable wall on opposite sides of the interior thereof, an endless chain movable over the interior surface of each wall, and a fabric belt interposed between each chain and the material being pressed.

5. A press, comprising a barrel, a radially adjustable wall on opposite sides of the interior thereof, an endless chain movable over the interior surface of each wall, a fabric belt interposed between each chain and the material being pressed, and means for varying the tension of said belts.

6. A press, comprising a barrel having a central bore and a plurality of radial slots extending for a portion of the length thereof, a block movable in each slot, and a porous belt movable over each block.

7. A press, comprising a barrel having a central bore and a plurality of radial slots extending for a portion of the length thereof, a block movable in each slot, an endless chain carried by each block and movable over the inner surface thereof, and a fabric belt interposed between each chain and the material being pressed.

In testimony whereof I have signed my name to this specification in the presence of two subscribing witnesses.

WILLIAM McCORMICK NEALE.

Witnesses:
    CHARLES D. BLACKWELDER,
    JOHN B. BRENNEN.